US011584870B2

(12) United States Patent
Inaba et al.

(10) Patent No.: US 11,584,870 B2
(45) Date of Patent: *Feb. 21, 2023

(54) PROTECTIVE FILM

(71) Applicant: SUMITOMO BAKELITE CO., LTD., Shinagawa-ku (JP)

(72) Inventors: Hironari Inaba, Shinagawa-ku (JP); Kazufusa Onodera, Shinagawa-ku (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/269,759

(22) PCT Filed: Aug. 21, 2019

(86) PCT No.: PCT/JP2019/032617
§ 371 (c)(1),
(2) Date: Feb. 19, 2021

(87) PCT Pub. No.: WO2020/040189
PCT Pub. Date: Feb. 27, 2020

(65) Prior Publication Data
US 2021/0317340 A1     Oct. 14, 2021

(30) Foreign Application Priority Data
Aug. 21, 2018 (JP) .............................. JP2018-154702

(51) Int. Cl.
| | | |
|---|---|---|
| B32B 7/12 | (2006.01) | |
| B32B 23/08 | (2006.01) | |
| B32B 27/08 | (2006.01) | |
| B32B 27/34 | (2006.01) | |
| G02B 1/14 | (2015.01) | |
| G02B 5/30 | (2006.01) | |
| B29C 51/10 | (2006.01) | |
| B29C 48/07 | (2019.01) | |
| B29C 48/21 | (2019.01) | |
| B29C 51/14 | (2006.01) | |
| C09J 7/29 | (2018.01) | |
| C09J 123/06 | (2006.01) | |
| C09J 133/08 | (2006.01) | |
| C09J 133/10 | (2006.01) | |
| C09J 153/02 | (2006.01) | |
| C09J 123/04 | (2006.01) | |
| C09J 123/12 | (2006.01) | |
| C09J 7/38 | (2018.01) | |
| B29C 53/04 | (2006.01) | |

(52) U.S. Cl.
CPC .............. *C09J 7/381* (2018.01); *B29C 53/04* (2013.01); *C09J 7/29* (2018.01); *C09J 123/06* (2013.01); *C09J 123/12* (2013.01); *C09J 2301/122* (2020.08); *C09J 2301/162* (2020.08); *C09J 2423/00* (2013.01); *C09J 2453/00* (2013.01)

(58) Field of Classification Search
None
See application file for complete search history.

(56) References Cited

U.S. PATENT DOCUMENTS

| | | | |
|---|---|---|---|
| 2011/0281067 A1* | 11/2011 | Yoshida | ................. C09J 123/02 428/141 |
| 2016/0109622 A1 | 4/2016 | Yoshida et al. | |
| 2017/0322344 A1 | 11/2017 | Yoshida et al. | |
| 2020/0385612 A1 | 12/2020 | Onodera | |

FOREIGN PATENT DOCUMENTS

| | | |
|---|---|---|
| EP | 3 006 971 A1 | 4/2016 |
| EP | 3 769 961 A1 | 1/2021 |
| JP | 2003-145616 A | 5/2003 |
| JP | 2010-275340 A | 12/2010 |
| JP | 2012-22293 A | 2/2012 |
| JP | 2018-183922 A | 11/2018 |
| WO | WO 2014/189078 A1 | 11/2014 |
| WO | WO 2016/080445 A1 | 5/2016 |
| WO | WO 2016/171223 A1 | 10/2016 |
| WO | WO 2018/199172 A1 | 11/2018 |
| WO | WO 2018-199173 A1 | 11/2018 |

OTHER PUBLICATIONS

International Search Report dated Nov. 19, 2019 in PCT/JP2019/032617 filed on Aug. 21, 2019, 2 pages.
C. A. Sierra, et al., "Thermal and Mechanical Properties of Poly-(styrene-b-ethylene-co-butylene-b-styrene) Triblock Copolymers" Polymer, [Elsevier Science Ltd.]. ISSN 0032-3861, XP4083082, vol. 38, No. 17, 1997, pp. 4325-4335.
"TAFMER™ A-4085S Ethylene Based Elastomer" Mitsui Chemicals—TAFMER™. URL: http://www.b2bpolymers.com/TDS/Mitsui_Tafmer_A-4085S.pdf, XP55909741, 2011, 1 page.

* cited by examiner

Primary Examiner — Sheeba Ahmed
(74) Attorney, Agent, or Firm — Oblon, McClelland, Maier & Neustadt, L.L.P.

(57) ABSTRACT

A protective film of the present invention is used at the time of performing heat bending on the resin substrate, and includes a base material layer and a pressure sensitive adhesive layer adhered to a resin substrate, in which the base material layer includes a first layer which is positioned on an opposite side of the pressure sensitive adhesive layer and has a melting point of 150° C. or higher, and includes a second layer which is positioned on a pressure sensitive adhesive layer side and has a melting point of lower than 150° C., the pressure sensitive adhesive layer has a melting point of lower than 150° C., and MFR of a thermoplastic resin contained in the second layer, which is measured in conformity with JIS K7210, is in a range of 0.5 g/10 min to 4.0 g/10 min.

20 Claims, 2 Drawing Sheets

PROTECTIVE FILM

CROSS-REFERENCE TO RELATED APPLICATIONS

This application is a national stage application of International Application No. PCT/JP2019/032617, filed Aug. 21, 2019, which is based upon and claims the benefit of priority to Japanese Patent Application No. 2018-154702, filed Aug. 21, 2018. The entire contents of these applications are incorporated herein by reference.

TECHNICAL FIELD

The present invention relates to a protective film used by being attached to a resin substrate at the time of performing heat bending on the resin substrate while heating the resin substrate.

BACKGROUND ART

A lens for sunglasses provided with a resin substrate having a configuration in which both surfaces of a polarizer are coated with a coating layer formed of a polycarbonate resin, a polyamide resin, or a cellulose resin is produced, for example, as follows. First, with protective films attached to both surfaces of the resin substrate, which has a flat plate shape in a plan view, the resin substrate is punched into a predetermined shape such as a circular shape in the plan view, and then the resin substrate is subjected to a heat bending while being heated. Next, after peeling off the protective films from the heat-bent resin substrate, a polycarbonate layer is injection-molded on a concave surface of this resin substrate to produce the lens for sunglasses.

As the protective film, for example, a film having a configuration in which a base material containing a polyolefin-based resin as a main material is attached to both surfaces of the resin substrate through a pressure sensitive adhesive layer containing, as a main material, polyethylene, an ethylene-propylene copolymer, and the like has been suggested (for example, see PTL 1).

However, in the protective film having such a configuration, in a case of, after heat bending, peeling off the protective films respectively attached to the both surfaces of the resin substrate, a gripping part in which a part of the protective film protrudes from an edge of the resin substrate in a surface direction of the resin substrate is not formed, so that it is not possible to peel off the protective film using this gripping part as a starting point. Accordingly, there is a problem that it takes time and labor to peel off the protective film.

In addition, even in a case where it is possible to form the gripping part by changing conditions during the heat bending, there is also a problem that two gripping parts protruding from the both surfaces of the resin substrate and facing each other are bonded to each other, and as a result, the two gripping parts cannot be used as the gripping part.

Further, these problems occur not only in the lens for sunglasses described above, but also in resin substrates such as a lens of goggles and a visor of helmets.

CITATION LIST

Patent Literature

[PTL 1] JP2003-145616A

SUMMARY OF INVENTION

Technical Problem

An object of the present invention is to provide a protective film in which, in a case of, after heat bending, peeling off the protective films respectively attached to both surfaces of a resin substrate, a gripping part in which a part of the protective film protrudes from an edge of the resin substrate in a surface direction of the resin substrate is formed and the gripping parts protruding from the both surfaces are prevented from being bonded to each other, so that the protective film can be smoothly peeled off using the gripping part as a starting point without taking time and labor.

Solution to Problem

Such an object can be achieved by the present invention described in the following items (1) to (10).

(1) A protective film which is used by being attached to a resin substrate at the time of performing heat bending on the resin substrate while heating the resin substrate, the protective film including:
a base material layer; and
a pressure sensitive adhesive layer which is positioned between the base material layer and the resin substrate and is adhered to the resin substrate,
in which the base material layer is formed of a laminate having a first layer which is positioned on an opposite side of the pressure sensitive adhesive layer, contains a thermoplastic resin, and has a melting point of 150° C. or higher, and having a second layer which is positioned on a pressure sensitive adhesive layer side, contains a thermoplastic resin, and has a melting point of lower than 150° C.,
the pressure sensitive adhesive layer contains a thermoplastic resin having a melting point of lower than 150° C., and
a melt flow rate of the thermoplastic resin contained in the second layer, which is measured under a condition of a load of 2.16 kgf in conformity with JIS K7210, is in a range of 0.5 g/10 min to 4.0 g/10 min.

(2) The protective film according to (1),
in which both the thermoplastic resin contained in the first layer and the thermoplastic resin contained in the second layer are polyolefins.

(3) The protective film according to (1) or (2),
in which the thermoplastic resin contained in the pressure sensitive adhesive layer is a polyolefin having a melting point of lower than 150° C. and an elastomer.

(4) The protective film according to (3),
in which the elastomer contained in the pressure sensitive adhesive layer contains a styrene-olefin-styrene block copolymer.

(5) The protective film according to (3) or (4),
in which the melt flow rate of the polyolefin contained in the pressure sensitive adhesive layer is in a range of 0.5 g/10 min to 10.0 g/10 min.

(6) The protective film according to any one of (1) to (5),
in which an average thickness of the first layer is in a range of 10 μm to 80 μm.

(7) The protective film according to any one of (1) to (6), in which an average thickness of the second layer is in a range of 10 μm to 60 μm.

(8) The protective film according to any one of (1) to (7), in which a pair of the protective films are respectively attached to both surfaces of the resin substrate.

(9) The protective film according to any one of (1) to (8), in which a coating layer, which is formed of a single layer or a laminate having at least one layer selected from a polycarbonate resin layer, a polyamide resin layer, and a cellulose resin layer, is provided on one surface or the other surface of the resin substrate, or wherein a pair of the coating layers are respectively provided on both surfaces of the resin substrate.

(10) The protective film according to any one of (1) to (9), in which the resin substrate is subjected to the heat bending by carrying out press molding or vacuum molding.

Advantageous Effects of Invention

According to the present invention, it is possible to respectively form, on both surfaces of a resin substrate, a gripping part in which a part of a protective film protrudes from an edge of the resin substrate in a surface direction of the resin substrate, in a case of, after heat bending, peeling off the protective films respectively attached to the both surfaces of the resin substrate. In addition, it is possible to accurately suppress or prevent the gripping parts which respectively protrude from the both surfaces of the resin substrate from being bonded to each other. Therefore, the protective film can be smoothly peeled off using the gripping part as a starting point without taking time and labor. Accordingly, in a case where the resin substrate is applied to, for example, a resin substrate of a lens for sunglasses, the lens for sunglasses can be produced with high productivity.

In addition, the heat-bent resin substrate has an excellent appearance, and without being attached to a mold used for the heat bending at the time of performing the heat bending, the protective film attached to the resin substrate can be peeled off from the mold with excellent peelability after heat bending.

DESCRIPTION OF EMBODIMENTS

Hereinafter, a protective film of the present invention will be described in detail based on suitable embodiments illustrated in the accompanying drawings.

A protective film of the present invention is a protective film used by being attached to a resin substrate at the time of performing heat bending on the resin substrate while heating the resin substrate. The protective film includes a base material layer, and a pressure sensitive adhesive layer which is positioned between the base material layer and the resin substrate and is adhered to the resin substrate, in which the base material layer is formed of a laminate having a first layer which is positioned on an opposite side of the pressure sensitive adhesive layer, contains a thermoplastic resin, and has a melting point of 150° C. or higher, and having a second layer which is positioned on a pressure sensitive adhesive layer side, contains a thermoplastic resin, and has a melting point of lower than 150° C., and the pressure sensitive adhesive layer contains a thermoplastic resin having a melting point of lower than 150° C. Furthermore, in the protective film of the present invention, a melt flow rate of the thermoplastic resin contained in the second layer, which is measured under a condition of a load of 2.16 kgf in conformity with JIS K7210, is in a range of 0.5 g/10 min to 4.0 g/10 min.

By forming the base material layer and pressure sensitive adhesive layer included in the protective film in such a configuration, it is possible to form a gripping part in which a part of the protective film (first layer) protrudes from an edge of the resin substrate in a surface direction of the resin substrate, in a case of, after heat bending, peeling off the protective films respectively attached to the both surfaces of the resin substrate. In addition, it is possible to accurately suppress or prevent the gripping parts which respectively protrude from the both surfaces of the resin substrate from being bonded to each other. Therefore, the protective film can be smoothly peeled off using this gripping part as a starting point without taking time and labor. Accordingly, in a case where the resin substrate is applied to, for example, a resin substrate of a lens for sunglasses, the lens for sunglasses can be produced with high productivity.

In addition, the heat-bent resin substrate has an excellent appearance, and without being attached to a mold used for the heat bending at the time of performing the heat bending, the protective film attached to the resin substrate can be peeled off from the mold with excellent peelability after heat bending.

Hereinafter, a method of producing a lens for sunglasses using the protective film of the present invention will be described prior to describing the protective film of the present invention.

<Method of Producing Lens for Sunglasses>

Figure 1:
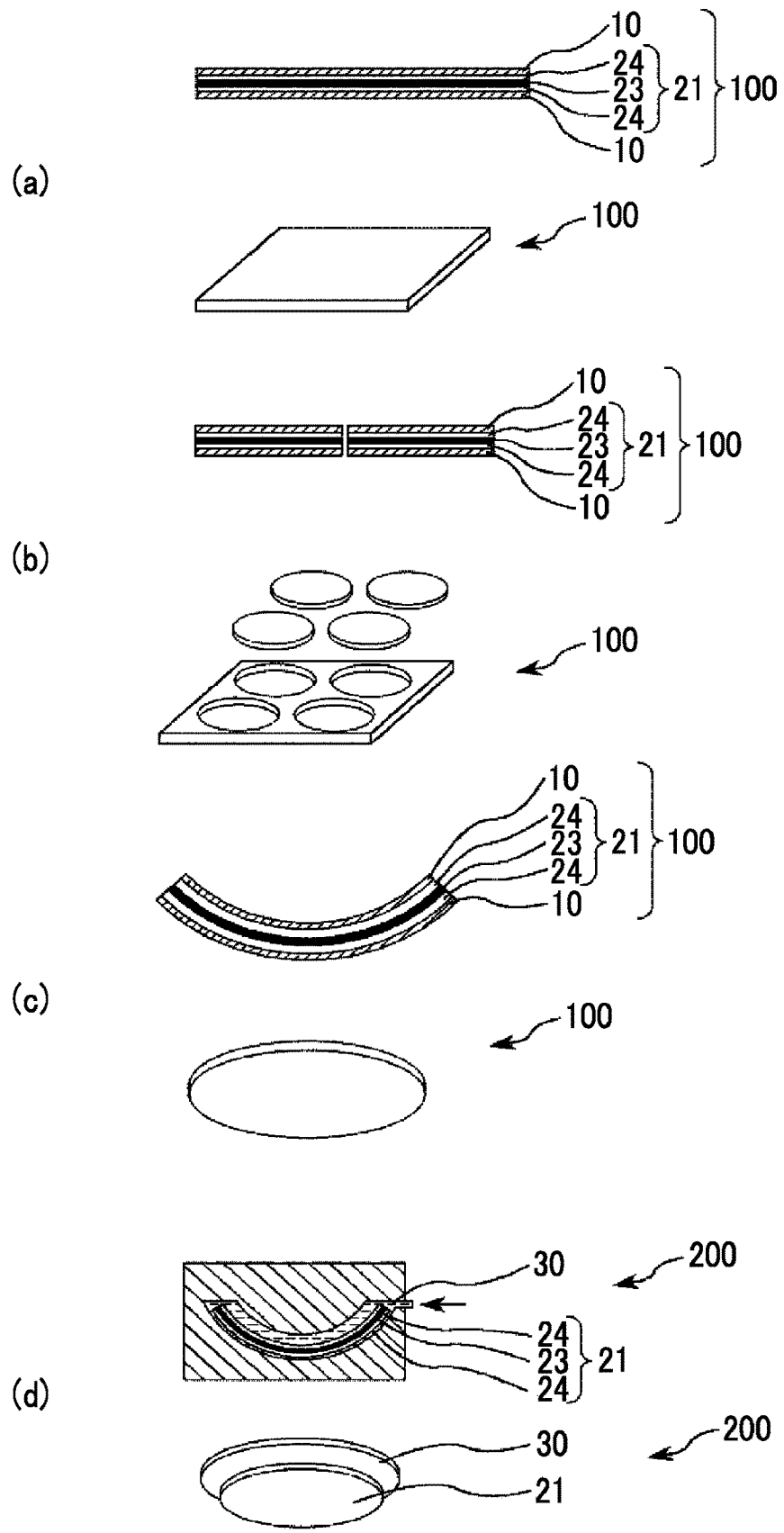
FIG. 1 shows schematic views for describing a method of producing a lens for sunglasses using a protective film.

FIG. 1 shows schematic views for describing a method of producing a lens for sunglasses using the protective film. Hereinafter, for convenience of description, the upper side of FIG. 1 will be referred to as "upper" and the lower side thereof will be referred to as "lower".

Hereinafter, each step in the method of producing a lens for sunglasses will be described in detail.

[1] First, a resin substrate 21 having a flat plate shape is prepared, and a protective film 10 (masking tape) is attached to both surfaces of the resin substrate 21, thereby obtaining a laminate 100 in which the protective film 10 is attached to the both surfaces of the resin substrate 21 (see (a) of FIG. 1).

In the present embodiment, as the resin substrate 21, a member in which a polarizer 23 is coated on both surfaces with coating layers 24 is prepared, the polarizer 23 functioning as an optical element that extracts linearly polarized light having a polarization surface in one predetermined direction from unpolarized natural light. Further, the coating layer 24 of the resin substrate 21 is composed of a single layer or a laminate having at least one layer selected from a polycarbonate resin layer, a polyamide resin layer, and a cellulose resin layer such as triacetyl cellulose. Furthermore, in addition to a case where the coating layer 24 is formed on both surfaces (surfaces on both sides) of the polarizer 23 as illustrated in (a) of FIG. 1, the coating layer 24 may be formed on any one of the upper surface (one surface) and the lower surface (the other surface).

[2] Next, as illustrated in (b) of FIG. 1, the prepared laminate 100, that is, the resin substrate 21 in a state where the protective film 10 is attached to the both surfaces of the resin substrate 21 is punched in a thickness direction thereof, thereby forming the laminate 100 into a circular shape in a plan view.

[3] Next, as illustrated in (c) of FIG. 1, the laminate 100 which has been formed into a circular shape is subjected to heat bending while being heated.

The heat bending is typically carried out by press molding or vacuum molding. The press molding is a molding method in which molds are respectively arranged above and below the laminate 100 and these upper and lower molds hold and pressurize the laminate 100 for processing, and the vacuum molding is a molding method in which one of the upper and lower molds is prepared and the laminate 100 is sucked from the one mold for processing. In the vacuum forming, at the time of sucking the laminate 100 from one mold, by arranging a sheet material formed of silicone rubber or the like on the other surface side of the laminate 100, or by pressing the other surface side with a hand or the like at the start of suction, the suction of the laminate 100 by the one mold may be assisted.

As described above, in the present embodiment, since the resin substrate 21 includes the coating layer 24, and the coating layer 24 is composed of a single layer or a laminate having at least one layer selected from a polycarbonate resin layer, a polyamide resin layer, and a cellulose resin layer, heating temperature (molding temperature) of the laminate 100 (resin substrate 21) during the heat bending is set to be preferably in a range of approximately 110° C. to 150° C. and more preferably in a range of approximately 140° C. to 150° C. in consideration of melting or softening temperature of the coating layer 24. By setting the heating temperature to be within the above-described range, the resin substrate 21 can be reliably heat-bent in a state where the resin substrate 21 is softened or melted while preventing a change in quality and deterioration of the resin substrate 21.

[4] Next, as illustrated in (d) of FIG. 1, the protective film 10 is peeled off from the heat-bent resin substrate 21, that is, the heat-bent laminate 100, and a polycarbonate layer 30 formed of a polycarbonate resin is injection-molded on a concave surface of this resin substrate 21. Further, for example, a polyamide layer formed of a polyamide resin may be formed on the concave surface of the resin substrate 21 in place of the polycarbonate layer 30.

In this manner, a lens 200 for sunglasses including the heat-bent resin substrate 21 is produced.

By applying the protective film of the present invention to the method of producing a lens for sunglasses as described above and using the gripping part formed on the laminate 100, the protective film 10 can be smoothly peeled off from the resin substrate 21 in the step [4] without taking time and labor. Hereinafter, the protective film of the present invention will be described in detail.

<Protective Film 10>

Figure 2:
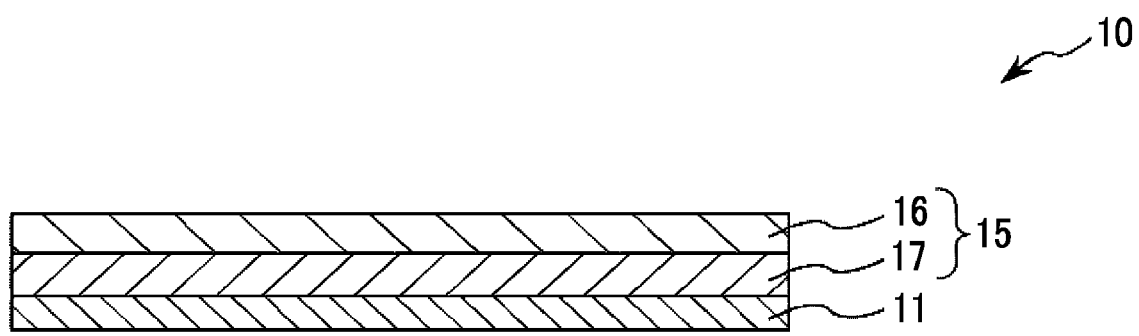
FIG. 2 shows a longitudinal cross-sectional view illustrating a suitable embodiment of the protective film of the present invention.

FIG. 2 shows a longitudinal cross-sectional view illustrating a suitable embodiment of the protective film of the present invention. Hereinafter, for convenience of description, the upper side of FIG. 2 will be referred to as "upper" and the lower side thereof will be referred to as "lower".

As illustrated in FIG. 2, the protective film 10 includes a base material layer 15 and a pressure sensitive adhesive layer 11 which is positioned between this base material layer 15 and the resin substrate 21 and is adhered (bonded) to the resin substrate 21. Furthermore, the base material layer 15 includes a first layer 16 which is positioned on the opposite side of the pressure sensitive adhesive layer 11, that is, on a molding die side and a second layer 17 which is positioned on the pressure sensitive adhesive layer 11 side, that is, on the resin substrate 21 side.

Hereinafter, each of these layers will be described in detail.

«Base Material Layer 15»

The base material layer 15 is bonded to the resin substrate 21 (coating layer 24) through the pressure sensitive adhesive layer 11, thereby functioning as a functional layer (protective layer) that protects (masks) the resin substrate 21 during the punching and heat bending of the resin substrate 21 in the step [2] and step [3] and as a functional layer (protective layer) for peeling off (releasing) the resin substrate 21 (protective film 10) from a mold used for heat bending after the heat bending in the step [3].

Furthermore, in a case of respectively peeling off the protective film 10 from the both surfaces of the resin substrate 21 in the step [4], the base material layer 15 forms a gripping part in which a part of the protective film 10 protrudes from an edge of the resin substrate 21 in a surface direction of the resin substrate 21. Therefore, the base material layer 15 also functions as a functional layer for peeling off the protective film 10 using this gripping part as a starting point. Accordingly, the protective film can be smoothly peeled off from the resin substrate using the gripping part as a starting point without taking time and labor.

In the present invention, in order to allow the base material layer 15 to exhibit these functions, as illustrated in FIG. 2, the base material layer 15 is formed of a laminate having the first layer 16 which is positioned on the opposite side of the pressure sensitive adhesive layer 11, contains a thermoplastic resin, and has a melting point of 150° C. or higher and having the second layer 17 which is positioned on the pressure sensitive adhesive layer 11 side, contains a thermoplastic resin, and has a melting point of lower than 150° C. In addition, a melt flow rate of the thermoplastic resin contained in the second layer 17, which is measured under a condition of a load of 2.16 kgf in conformity with JIS K7210, is in a range of 0.5 g/10 min to 4.0 g/10 min. Hereinafter, the first layer 16 and the second layer 17 included in the base material layer 15 will be described.

«First Layer 16»

The first layer 16 is positioned on the opposite side of the pressure sensitive adhesive layer 11, that is, on a molding die side during the heat bending in the step [3], thereby functioning as an outermost layer that protects the resin substrate 21 and peels off (releases) the resin substrate 21 (protective film 10) from the mold used for heat bending after the heat bending in the step [3]. Furthermore, the first layer 16 functions as a gripping part protruding in the surface direction of the resin substrate 21 at the time of peeling off the protective film 10 from the resin substrate 21 in the step [4].

For the purpose of maintaining excellent peelability (releasability) from the molding die after the heat bending in the step [3], that is, allowing the first layer 16 not to adhere to the molding die (mold), and allowing the first layer 16 to function as a gripping part at the time of peeling off the protective film 10 from the resin substrate 21 in the step [4], the first layer 16 contains a thermoplastic resin, and the melting point thereof is set to be 150° C. or higher and preferably in a range of approximately 155° C. to 165° C.

Here, as described above, the heating temperature of the coating layer 24 (resin substrate 21) during the heat bending in the step [3] is set to be preferably in a range of approximately 110° C. to 150° C. Accordingly, by setting the melting point of the first layer 16 as described above, it is possible to reliably prevent the first layer 16 from being melted or softened during the heat bending in the step [3]. Therefore, it is possible to reliably peel off (release) the laminate 100 from the molding die after the heat bending in the step [3]. In addition, the first layer 16 can be used as the gripping part at the time of peeling off the protective film 10 in the step [4].

The constituent material of the first layer 16 is not particularly limited as long as a material which contains a thermoplastic resin and is capable of setting the melting point of the first layer 16 to be 150° C. or higher, but a thermoplastic resin having a melting point of 150° C. or higher is preferably exemplified, and a polyolefin having a melting point of 150° C. or higher is more preferably selected. In this manner, the melting point of the first layer 16 can easily be set to be 150° C. or higher. In addition, in a case where the second layer 17 described later is also formed to contain a polyolefin and both the first layer 16 and the second layer 17 are formed to contain a polyolefin, since adhesiveness between the base material layer 15 (the first layer 16 and the second layer 17) and the pressure sensitive adhesive layer 11 is excellent, it is possible to accurately suppress or prevent each layer of the protective film 10 from being peeled off.

For example, among polyolefins contained in the pressure sensitive adhesive layer 11 described later, a material having a melting point of 150° C. or higher is exemplified as the polyolefin having a melting point of 150° C. or higher.

In addition, the average thickness of the first layer 16 is preferably in a range of 10 μm to 80 μm and more preferably in a range of 15 μm to 45 μm. In this manner, the above-described functions as the first layer 16 can be reliably exhibited.

«Second Layer 17»

The second layer 17 is positioned on the pressure sensitive adhesive layer 11 side, that is, the resin substrate 21 side and functions as an intermediate layer positioned between the pressure sensitive adhesive layer 11 and the first layer 16.

For the purpose that the second layer 17 is melted or softened during the heat bending in the step [3] and positioned between the first layer 16 positioned on the molding die side and the resin substrate 21 to protect the resin substrate 21, and functions as an intermediate layer for forming, in the surface direction of the resin substrate 21, a gripping part formed by protrusion of the first layer 16 from an edge of a curved surface of the laminate 100 due to the heat bending of the laminate 100, the second layer 17 contains a thermoplastic resin, and the melting point thereof is set to be lower than 150° C. and preferably in a range of approximately 110° C. to 125° C. In addition, the melt flow rate (MFR) of the thermoplastic resin contained in the second layer 17, which is measured under a condition of a load of 2.16 kgf in conformity with JIS K7210, is in a range of 0.5 g/10 min to 4.0 g/10 min, preferably in a range of 0.7 g/10 min to 3.0 g/10 min.

Here, as described above, the heating temperature of the coating layer 24 (resin substrate 21) during the heat bending in the step [3] is set to be preferably in a range of approximately 110° C. to 150° C. Accordingly, by setting the melting point of the second layer 17 as described above, it is possible to reliably melt or soften the second layer 17 during the heat bending in the step [3]. Therefore, in the step [3], since the second layer 17 exhibits the function as the intermediate layer in a molten or softened state and also protects the resin substrate 21 as a cushion layer between the first layer 16 positioned on the molding die side and the resin substrate 21, the heat bending can be performed while accurately suppressing or preventing formation of unevenness on the surface of the resin substrate 21 due to transfer of the mold surface shape. Accordingly, the heat-bent resin substrate 21 having an excellent appearance is obtained. Furthermore, since the second layer 17 is in a molten or softened state, the first layer 16 can be shifted in the surface direction of the resin substrate 21. As a result, the gripping part formed of the first layer 16 is formed on the edge of the laminate 100.

Furthermore, the melt flow rate (MFR) of the thermoplastic resin contained in the second layer 17, which is measured under a condition of a load of 2.16 kgf in conformity with JIS K7210, is set to be in a range of 0.5 g/10 min to 4.0 g/min, preferably in a range of 0.7 g/10 min to 3.0 g/10 min. As described above, during the heat bending in the step [3], the gripping part formed of the first layer 16 is formed on the edge of the laminate 100. However, even in a case where the second layer 17 is in a molten or softened state, MFR is set to be within the above-described range and the formed gripping part has an appropriate length. Accordingly, it is possible to accurately suppress or prevent the gripping parts which protrude from both the upper surface and lower surface of the resin substrate 21 from being bonded to each other. Therefore, at the time of peeling off the protective film 10 in the step [4], since the portion of the first layer 16, which protrudes in the surface direction from the resin substrate 21, can be reliably used as a gripping part, the protective film 10 can be easily peeled off.

In a case where the heat bending in the step [3] is carried out by the press molding, the bonding of the gripping parts protruding from the both surfaces of the resin substrate 21 is caused by holding and pressurizing the laminate 100 with the upper and lower molds, and the frequency of occurrence is higher compared to a case of being carried out by the vacuum molding. However, by applying the present invention, even in the case where the heat bending in the step [3] is carried out by the press molding, it is possible to accurately suppress or prevent the gripping parts from being bonded to each other.

In addition, in the vacuum molding, in a case where the suction of the laminate 100 by the one mold is assisted by arranging a sheet material on the other surface side of the laminate 100, or by pressing the other surface side with a hand or the like at the start of suction, there is a high tendency for the gripping parts to be bonded to each other. However, by applying the present invention to this case, it is possible to accurately suppress or prevent the gripping parts from being bonded to each other.

In addition, in a case where the length of this gripping part is represented by $L_1$, the diameter of the laminate 100 in a plan view after the laminate 100 having a circular shape in a plan view is heat-bent in the step [3] is represented by $L_2$, and a radius R of curvature of the laminate 100 which has been heat-bent in the step [3] is set to 8.5 cm, "$(L_1/L_2) \times 100$" is preferably in a range of 0.1% to 1.0% and more preferably in a range of 0.2% to 0.5%. In a case where such a relationship is satisfied, since the gripping parts protruding from the both surfaces of the resin substrate 21 can be accurately suppressed or prevented from being bonded to each other, the protective film 10 in the step [4] can be reliably peeled off using the gripping part formed in the step [3].

The constituent material of the second layer 17 is not particularly limited as long as a material which contains a thermoplastic resin in which the melt flow rate is in a range of 0.5 g/10 min to 4.0 g/10 min and which is capable of setting the melting point of the second layer 17 to be lower than 150° C., but a thermoplastic resin which has the melt flow rate of 0.7 g/10 min to 3.0 g/10 min and has a melting point of lower than 130° C. is preferably exemplified, and a polyolefin which has the melt flow rate of 0.9 g/10 min to 2.5 g/10 min and has a melting point of lower than 125° C. is more preferably selected. In this manner, the melting point of the second layer 17 can easily be set to be lower than 150° C. In addition, in a case where the first layer 16 described above is also formed to contain a polyolefin and both the first layer 16 and the second layer 17 are formed to contain a polyolefin, since adhesiveness between the base material layer 15 (the first layer 16 and the second layer 17) and the pressure sensitive adhesive layer 11 is excellent, it is possible to accurately suppress or prevent each layer of the protective film 10 from being peeled off.

For example, among polyolefins contained in the pressure sensitive adhesive layer 11 described later, as a polyolefin which has the melt flow rate of 0.5 g/10 min to 4.0 g/10 min and has a melting point of lower than 150° C., a polyethylene homopolymer, an α-olefin/polyethylene copolymer, an α-olefin/polypropylene copolymer, or the like, which has the melt flow rate of 0.5 g/10 min to 4.0 g/10 min and has a melting point of lower than 150° C., is exemplified.

In addition, the average thickness of the second layer 17 is preferably in a range of 10 μm to 60 μm and more preferably in a range of 15 μm to 45 μm. In this manner, the above-described functions as the second layer 17 can be reliably exhibited.

«Pressure Sensitive Adhesive Layer 11»

The pressure sensitive adhesive layer 11 is positioned (interposed) between the base material layer 15 and the resin substrate 21, and is a layer for bonding the base material layer 15 to the resin substrate 21 by adhering to the resin substrate 21.

Furthermore, the pressure sensitive adhesive layer 11 also is melted or softened during the heat bending in the step [3], and has a function as a bonding layer for forming, in the surface direction of the resin substrate 21, a gripping part formed by protrusion of the first layer 16 from the edge of the curved surface of the laminate 100 due to the heat bending of the laminate 100. Accordingly, same as the second layer 17, the pressure sensitive adhesive layer 11 contains a thermoplastic resin, and the melting point thereof is set to be lower than 150° C. and preferably in a range of approximately 105° C. to 123° C.

Accordingly, by setting the melting point of the pressure sensitive adhesive layer 11 as described above, same as the second layer 17, it is possible to reliably melt or soften the pressure sensitive adhesive layer 11 during the heat bending in the step [3]. Therefore, in the step [3], since the pressure sensitive adhesive layer 11 exhibits the function as the bonding layer in a molten or softened state, and in a state where the base material layer 15 is bonded to the resin substrate 21, the first layer 16 can be shifted in the surface direction of the resin substrate 21, the gripping part formed of the first layer 16 can be reliably formed on the edge of the laminate 100.

In addition, in the present invention, as the pressure sensitive adhesive layer 11, a sheet material which enables the punching and heat bending of the resin substrate 21 in the step [2] and the step [3] without peeling off the protective film 10 from the resin substrate 21 and enables peeling of the protective film 10 off from the resin substrate 21 in the step [4] is preferably used.

Accordingly, it is preferable that the pressure sensitive adhesive layer 11 contains a polyolefin having a melting point of lower than 150° C. and an elastomer. As described above, by configuring the pressure sensitive adhesive layer 11 to contain both the polyolefin having a melting point of lower than 150° C. and the elastomer, the above-described effects can be reliably exhibited and the melting point of the pressure sensitive adhesive layer 11 can be relatively easily set to be lower than 150° C.

Here, the retention property of the resin substrate 21 due to the protective film 10 in the step [2] and the step [3] and the peelability of the protective film 10 from the resin substrate 21 in the step [4] can be evaluated based on the peel strength with respect to the resin substrate 21 (coating layer 24).

Specifically, the protective film 10 is attached to the coating layer 24. Thereafter, a peel strength $T_1$ between the coating layer 24 and the protective film 10, which is measured after being stored under a temperature condition of 50° C. for 12 hr in conformity with JIS C-6481:1996, and a peel strength $T_2$ between the coating layer 24 and the protective film 10, which is measured after being stored under a temperature condition of 150° C. for 5 min in conformity with JIS C-6481:1996, are respectively preferably in a range of 0.05 N/25 mm to 3.0 N/25 mm, more preferably in a range of 0.10 N/25 mm to 1.5 N/25 mm, and still more preferably in a range of 0.15 N/25 mm to 0.5 N/25 mm. By setting the peel strength $T_1$ and the peel strength $T_2$, after being stored respectively under a temperature condition of 50° C. for 12 hr and under a temperature condition of 150° C. for 5 min, to be within the above-described range, the punching and heat bending of the resin substrate 21 in the step [2] and the step [3] can be performed without peeling off the protective film 10 from the resin substrate 21, and the peeling of the protective film 10 off from the resin substrate 21 in the step [4] can be performed even in a case where the protective film 10 has undergone heat history resulting from the heat bending in the step [3].

In addition, as described above, among the polyolefin and elastomer included in the pressure sensitive adhesive layer 11, the polyolefin preferably has a melting point of lower than 150° C. and more preferably in a range of approximately 105° C. to 123° C. In a case where the pressure sensitive adhesive layer 11 contains a polyolefin having such a melting point, the melting point of the pressure sensitive adhesive layer 11 can be relatively easily set to be lower than 150° C. Accordingly, the punching and heat bending of the resin substrate 21 in the step [2] and the step [3] can be performed without peeling off the protective film 10 from the resin substrate 21, and the peeling of the protective film 10 off from the resin substrate 21 in the step [4] can be more easily performed. Furthermore, during the heat bending of the resin substrate 21 in the step [3], the gripping part can be reliably formed.

In addition, the polyolefin is not particularly limited as long as a material which can set the melting point of the pressure sensitive adhesive layer 11 to be lower than 150° C. Examples thereof include a homopolymer or copolymer of polypropylene, a homopolymer or copolymer of polyethylene, a propylene-ethylene block copolymer having an EPR phase (rubber phase), an ethylene-vinyl acetate block copolymer, an ethylene-ethyl acrylate block copolymer, and an ethylene-methyl methacrylate block copolymer, and these may be used alone or in a combination of two or more kinds thereof. Among these, at least one of a polyethylene homopolymer, an α-olefin/polyethylene copolymer, or an α-olefin/polypropylene copolymer, which has a melting point of lower than 150° C., is preferable. These materials can be obtained at a relatively low cost, and even a material having a melting point of lower than 150° C. can be easily obtained. In addition, with these materials, it is possible to impart transparency to the pressure sensitive adhesive layer 11. Accordingly, in a case where the base material layer 15 also has transparency, the protective film 10 can have transparency. Therefore, in a case of, in the step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the step [2], and as the result, the yield of the lens 200 for sunglasses to be obtained can be improved.

Furthermore, the melt flow rate (MFR) of the polyolefin, which is measured under a condition of a load of 2.16 kgf in conformity with JIS K7210, is preferably in a range of 0.5 g/10 min to 10.0 g/10 min, more preferably in a range of 1.0 g/10 min to 5.0 g/10 min, and still more preferably in a range of 2.0 g/10 min to 4.0 g/10 min. In this manner, since the pressure sensitive adhesive layer 11 has excellent initial familiarity with the coating layer 24, the attachment of the protective film 10 to the resin substrate 21 in the step [1] can be performed with excellent adhesiveness. In addition, the effects obtained by setting MFR of the thermoplastic resin contained in the second layer 17 to be within the above-described range can be exhibited more significantly.

In addition, as described above, it is preferable that the pressure sensitive adhesive layer 11 contains an elastomer in addition to the polyolefin. In a case where the pressure sensitive adhesive layer 11 contains an elastomer as described above, it is possible to accurately suppress or prevent the pressure sensitive adhesive layer 11 from remaining on the resin substrate 21 during the peeling of the protective film 10 off from the resin substrate 21 in the step [4], that is, accurately suppress or prevent adhesive residues from being generated on the resin substrate 21. Therefore, the protective film 10 can be more smoothly peeled off from the resin substrate 21.

The elastomer is not particularly limited, and examples thereof include an $\alpha$-olefin/polyethylene copolymer elastomer, an $\alpha$-olefin/polypropylene copolymer elastomer, and a styrene block elastomer. Among these, a styrene block elastomer is preferable, and a styrene-olefin-styrene block copolymer elastomer is particularly preferable. As described above, by configuring the elastomer to contain styrene as a monomer component, it is possible to accurately suppress or prevent adhesive residues from being generated on the resin substrate 21 in the step [4]. Further, examples of the $\alpha$-olefin include 1-hexene, 4-methyl-1-pentene, 1-octene, 1-butene, 1-pentene, and 1-heptene.

In this case, the content of the styrene in the elastomer is preferably 25 wt % or less and more preferably in a range of 10 wt % to 18 wt %. In this manner, it is possible to accurately suppress or prevent an increase in hardness of the pressure sensitive adhesive layer 11 caused by an increase in content of the styrene. Accordingly, it is possible to more accurately suppress or prevent adhesive residues from being generated on the resin substrate 21 while reliably maintaining adhesive force of the pressure sensitive adhesive layer 11 against the resin substrate 21 (coating layer 24).

Furthermore, examples of the styrene-olefin-styrene block copolymer include a styrene-isobutylene-styrene block copolymer (SIBS), a styrene-ethylene-butylene-styrene block copolymer (SEBS), a styrene-butadiene-styrene block copolymer (SBS), and a styrene-isoprene-styrene copolymer (SIS). Among these, a styrene-ethylene-butylene-styrene block copolymer (SEBS) is preferable. In a case where SEBS is selected as the styrene-olefin-styrene block copolymer, the content of the styrene in the elastomer can be easily set to be 25 wt % or less, and the above-described effects can be reliably obtained.

The content of the elastomer in the pressure sensitive adhesive layer 11 is not particularly limited, but is preferably in a range of 3 wt % to 50 wt % and more preferably in a range of 5 wt % to 30 wt %. In this manner, the effects obtained by containing the elastomer in the pressure sensitive adhesive layer 11 can be exhibited more significantly.

In addition, the average thickness of the pressure sensitive adhesive layer 11 is preferably in a range of 3 μm to 40 μm and more preferably in a range of 5 μm to 20 μm. In this manner, the above-described functions as the pressure sensitive adhesive layer 11 can be reliably exhibited.

In the present specification, the melting point of each layer which constitutes the protective film 10 including the pressure sensitive adhesive layer 11 is acquired by multiplying, by the ratio of each constituent material, the melting point (the peak temperature obtained by DSC measurement) of each constituent material contained in each layer and summing the obtained values, and the acquired value is defined as the melting point.

In addition, each layer of the pressure sensitive adhesive layer 11 and the base material layer 15 (the first layer 16 and the second layer 17) in the above-described protective film 10 may contain various additives such as an antioxidant, a light stabilizer, and an antistatic agent in addition to the above-described constituent materials.

In addition, an intermediate layer containing the above-described additives may be formed between each layer thereof.

Furthermore, the above-described protective film 10 may be produced using any method. For example, the protective film 10 can be produced using a co-extrusion method.

Specifically, three extruders are prepared, and the constituent materials of the pressure sensitive adhesive layer 11, the first layer 16, and the second layer 17 are respectively stored in the three extruders. Thereafter, these constituent materials are extruded after being melted or softened. In this manner, from a co-extrusion T die, a laminate in a molten or softened state, in which these constituent materials are laminated in layers, is supplied to a sheet molding unit configured of a plurality of cooling rolls, and then is cooled in this sheet supplying unit, thereby producing the protective film 10.

Hereinbefore, the protective film of the present invention has been described, but the present invention is not limited thereto. Each layer constituting the protective film may be replaced with a layer which is capable of exhibiting the same function and has an optional configuration.

Furthermore, in the above-described embodiment, the case where the protective film of the present invention is used by being attached to the resin substrate at the time of performing heat bending of the resin substrate of a lens for sunglasses has been described. However, the protective film of the present invention can be applied to the heat bending of the resin substrate in a lens for sunglasses, and can also be used for heat bending of the resin substrate in a lens of goggles, a visor of helmets, and the like.

EXAMPLES

Hereinafter, the present invention will be described in detail based on examples. Further, the present invention is not limited to these examples.

1. Examination of Configuration of Second Layer Included in Base Material Layer

1-1. Preparation of Raw Materials

First, raw materials used for production of the protective films of each of Examples and Comparative Examples are as follows.

<Polyolefin>

Random polypropylene having melting point of 145° C. (MFR (heating temperature: 230° C.)=0.8 g/10 min)

Random polypropylene having melting point of 132° C. (MFR (heating temperature: 230° C.)=1.5 g/10 min)

Linear low-density polyethylene having melting point of 121° C. (MFR (heating temperature: 190° C.)=2.5 g/10 min)

Linear low-density polyethylene having melting point of 121° C. (MFR (heating temperature: 190° C.)=0.9 g/10 min)

Linear low-density polyethylene having melting point of 119° C. (MFR (heating temperature: 190° C.)=4.0 g/10 min)

Linear low-density polyethylene having melting point of 114° C. (MFR (heating temperature: 190° C.)=2.0 g/10 min)

Low-density polyethylene having melting point of 110° C. (MFR (heating temperature: 190° C.)=0.8 g/10 min)

Homopolypropylene having melting point of 162° C. (MFR (heating temperature: 230° C.)=0.5 g/10 min)

Homopolypropylene having melting point of 158° C. (MFR (heating temperature: 230° C.)=2.5 g/10 min)

Low-density polyethylene having melting point of 110° C. (MFR (heating temperature: 190° C.)=5.0 g/10 min)

Low-density polyethylene having melting point of 109° C. (MFR (heating temperature: 190° C.)=0.35 g/10 min)

<Elastomer>

Styrene-ethylene-butylene-styrene block copolymer (SEBS) (manufactured by Asahi Kasei Corporation, "TUFTEC H1221")

1-2. Production of Protective Film

Example 1A

[1A] First, as a formation of a pressure sensitive adhesive layer, SEBS and a linear low-density polyethylene having a melting point of 114° C. (MFR (heating temperature: 190° C.)=2.0 g/10 min) were kneaded such that the content of SEBS was set to 10 wt %, thereby preparing a pressure sensitive adhesive layer forming material (resin composition).

[2A] Next, the prepared pressure sensitive adhesive layer forming material, a linear low-density polyethylene having a melting point of 121° C. (MFR (heating temperature: 190° C.)=2.5 g/10 min) as a second layer (intermediate layer) forming material, and a homopolypropylene having a melting point of 162° C. (MFR (heating temperature: 230° C.)=0.5 g/10 min) as a first layer (outermost layer) forming material were respectively stored in three extruders.

[3A] Next, these forming materials were extruded from the three extruders after being melted. Thereafter, from a co-extrusion T die, a laminate in a molten state, in which these forming materials were laminated in layers, was obtained, and this laminate was cooled to obtain a protective film of Example 1A.

Examples 2A to 7A and Comparative Examples 1A to 4A

Protective films of Examples 2A to 7A and Comparative Examples 1A to 4A were obtained in the same manner as in Example 1A described above, except that the type of polyolefin used as the second layer forming material in the step [2A] was changed as shown in Table 1.

1-3. Evaluation

The protective films of each of Examples and Comparative Examples were evaluated according to the following method.

<1> Evaluation of Size of Gripping Part

First, resin substrates (manufactured by Sumitomo Bakelite Co., Ltd., "P1352") formed by holding a polarizer with two polycarbonate substrates (polycarbonate layers) were respectively prepared for the protective films of each of Examples and Comparative Examples. Both surfaces of the resin substrate were pressure-bonded under a condition of a load of 0.5 kg/cm$^2$ using a roll so that the protective films were attached thereto, thereby obtaining a laminate. Thereafter, the laminate was punched in the thickness direction to form a laminate (diameter: 7.5 cm) having a circular shape in a plan view.

Next, the laminate which had been formed into a circular shape was heat-bent by performing press molding while being heated at 150° C. In this manner, the circular laminate was formed into a curved shape in which the radius R of curvature was 8.5 cm.

Next, a length $L_1$ of a gripping part in the laminate which had been heat-bent and a diameter $L_2$ of the laminate in a plan view were measured, and $(L_1/L_2) \times 100$ was obtained, and then the evaluation was performed as follows based on the obtained result of $(L_1/L_2) \times 100$.

A: obtained result was in a range of 0.2% to 0.5%.

B: obtained result was 0.1% or more and less than 0.2%, or more than 0.5% and 1.0% or less.

C: obtained result was less than 0.1% or more than 1.0%.

<2> Evaluation of Presence or Absence of Bonding Between Gripping Parts

First, resin substrates (manufactured by Sumitomo Bakelite Co., Ltd., "P1352") formed by holding a polarizer with two polycarbonate substrates (polycarbonate layers) were respectively prepared for the protective films of each of Examples and Comparative Examples. Both surfaces of the resin substrate were pressure-bonded under a condition of a load of 0.5 kg/cm$^2$ using a roll so that the protective films were attached thereto, thereby obtaining a laminate. Thereafter, the laminate was punched in the thickness direction to form a laminate (diameter: 7.5 cm) having a circular shape in a plan view.

Next, the laminate which had been formed into a circular shape was heat-bent by performing press molding while being heated at 150° C. In this manner, the circular laminate was formed into a curved shape in which the radius R of curvature was 8.5 cm.

Next, in the laminate which had been heat-bent, the presence or absence of bonding between two gripping parts was observed, and then the evaluation was performed as follows based on the observation result.

A: no bonding was clearly observed between the two gripping parts, and the two gripping parts could be easily used as a gripping part at the time of peeling off the protective film.

B: although some bonding was observed between the two gripping parts, the two gripping parts could be relatively easily used as a gripping part at the time of peeling off the protective film.

C: bonding was clearly observed between the two gripping parts, and the two gripping parts could not be used as a gripping part at the time of peeling off the protective film.

<3> Evaluation of Appearance of Resin Substrate after Heat Bending

First, resin substrates (manufactured by Sumitomo Bakelite Co., Ltd., "P1352") formed by holding a polarizer with two polycarbonate substrates (polycarbonate layers) were respectively prepared for the protective films of each of Examples and Comparative Examples. Both surfaces of the resin substrate were pressure-bonded under a condition of a load of 0.5 kg/cm² using a roll so that the protective films were attached thereto, thereby obtaining a laminate. Thereafter, the laminate was punched in the thickness direction to form a laminate (diameter: 7.5 cm) having a circular shape in a plan view.

Next, the laminate which had been formed into a circular shape was heat-bent by performing press molding while being heated at 150° C. In this manner, the circular laminate was formed into a curved shape in which the radius R of curvature was 8.5 cm. Thereafter, the protective films were peeled off from the laminate which had been heat-bent.

Next, the evaluation was performed as follows based on appearance of a surface of the heat-bent resin substrate from which the protective films had been peeled off.

A: transfer of the mold was not found at all, and the smoothness was the same as that before forming.

B: transfer of the mold somewhat occurred, but there is no problem in practical use.

C: unevenness caused by transfer of the mold was so significant that practical use was not possible.

<4> Evaluation of Peelability from Mold

First, resin substrates (manufactured by Sumitomo Bakelite Co., Ltd., "P1352") formed by holding a polarizer with two polycarbonate substrates (polycarbonate layers) were respectively prepared for the protective films of each of Examples and Comparative Examples. Both surfaces of the resin substrate were pressure-bonded under a condition of a load of 0.5 kg/cm² using a roll so that the protective films were attached thereto, thereby obtaining a laminate. Thereafter, the laminate was punched in the thickness direction to form a laminate (diameter: 7.5 cm) having a circular shape in a plan view.

Next, the laminate which had been formed into a circular shape was heat-bent by performing press molding while being heated at 150° C. In this manner, the circular laminate was formed into a curved shape in which the radius R of curvature was 8.5 cm.

Next, the evaluation was performed as follows based on peelability of the laminate, which had been heat-bent, from the mold used for the press molding of the laminate.

A: laminate could be peeled off easily.

B: laminate was somewhat adhered to the mold, but could be peeled off.

C: laminate was adhered to the mold, so that the laminate could not be peeled off.

The evaluation results of the protective films of each of Examples and Comparative Examples, which had been obtained in the above-described manner, are listed in Table 1.

TABLE 1

| | | | MFR | Example 1A | Example 2A | Example 3A | Example 4A | Example 5A | Example 6A | Example 7A | Comparative Example 1A | Comparative Example 2A | Comparative Example 3A | Comparative Example 4A |
|---|---|---|---|---|---|---|---|---|---|---|---|---|---|---|
| First Layer | Configuration of first layer | Homopolypropylene having melting point of 162° C. (wt %) | 0.5 | | | | | | 100 | | | | | |
| | | Average thickness (nm) | | | | | | | 50 | | | | | |
| Second Layer | Configuration of second layer | Random polypropylene having melting point of 245° C. (wt %) | 0.8 | | 100 | | | | | | | | | |
| | | Random polypropylene having melting point of 232° C. (wt %) | 1.5 | | | 100 | | | | | | | | |
| | | Random polypropylene having melting point of 121° C. (wt %) | 2.5 | 100 | | | | | | | | | | |
| | | Random polypropylene having melting point of 121° C. (wt %) | 0.9 | | | | 100 | | | | | | | |
| | | Random polypropylene having melting point of 119° C. (wt %) | 4.0 | | | | | 100 | | | | | | |
| | | Random polypropylene having melting point of 114° C. (wt %) | 2.0 | | | | | | | 100 | | | | |
| | | Random polypropylene having melting point of 210° C. (wt %) | 0.8 | | | | | | | | 100 | | | |
| | | Random polypropylene having melting point of 162° C. (wt %) | 0.5 | | | | | | | | | 100 | | |
| | | Random polypropylene having melting point of 158° C. (wt %) | 2.5 | | | | | | | | | | | 100 |

TABLE 1-continued

| | | MFR | Example 1A | Example 2A | Example 3A | Example 4A | Example 5A | Example 6A | Example 7A | Comparative Example 1A | Comparative Example 2A | Comparative Example 3A | Comparative Example 4A |
|---|---|---|---|---|---|---|---|---|---|---|---|---|---|
| | Random polypropylene having melting point of 210° C. (wt %) | 5.0 | | | | | | | | | | 100 | |
| | Random polypropylene having melting point of 109° C. (wt %) | 0.4 | | | | | | | | | | | 100 |
| | Melting point of second later (° C.) | | 121 | 145 | 132 | 121 | 119 | 114 | 120 | 162 | 158 | 110 | 109 |
| | Average thickness (nm) | | | | | | 20 | | | | | | |
| Pressure sensitive adhesive layer / Configuration of pressure sensitive adhesive layer | Linear low-density polyethylene having melting point of 114° C. (wt %) | 2.0 | | | | | 90 | | | | | | |
| | Styrene-ethylene-butylene-styrene block copolymer "TJFTEC H1221" (wt %) | | | | | | 20 | | | | | | |
| | Average thickness (nm) | | | | | | 20 | | | | | | |
| Evaluation result | Gripping part ((L$_1$/L$_2$) × 100) (%) | | A | B | A | A | A | A | B | C | C | A | C |
| | Pressure or absence of bonding between gripping parts | | A | A | A | A | B | A | A | A | A | C | A |
| | Appearing of surface of resin substrate after molding | | A | B | B | A | B | A | A | C | C | A | A |
| | Peelability from mold | | A | A | A | A | A | A | A | A | A | A | A |

As listed in Table 1, in the protective films of each of Examples, since the melting point of the second layer was lower than 150° C. and MFR of the thermoplastic resin contained in the second layer was set to be in a range of 0.5 g/10 min to 4.0 g/10 min, the size of (L$_1$/L$_2$)×100, which was an index of the gripping part, was set to be in a range of 0.1% to 1.0%, and no bonding was observed between the two gripping parts. Therefore, it was found that these gripping parts could be used as a gripping part at the time of peeling off the protective film in the step [4], and the protective film could be easily peeled off. In addition, it was found that unevenness caused by transfer of the mold surface shape was not observed on the surface of the heat-bent resin substrate, and the resin substrate could be heat-bent with an excellent appearance.

In addition, in the protective films of each of Examples, it was found that, by setting the melting point of the first layer to be 150° C. or higher, the heat-bent laminate could be peeled off with excellent peelability in which the protective film did not adhere to the molding die after the heat bending in the step [3].

On the contrary, in the protective films of each of Comparative Examples, in which the melting point of the second layer was 150° C. or higher, the size of (L$_1$/L$_2$)×100 was less than 0.1%, and this result indicated that the formed gripping part could not be used as the gripping part at the time of peeling off the protective film in the step [4]. Furthermore, in the protective films of each of Comparative Examples, in which MFR of the thermoplastic resin contained in the second layer was less than 0.5 g/10 min or more than 4.0 g/10 min, the size of (L$_1$/L$_2$)×100, which was an index of the gripping part, was less than 0.1%, or even in a case where the gripping part was formed, bonding was clearly observed between the two gripping parts. This result indicated that the formed gripping part could not be used as the gripping part at the time of peeling off the protective film in the step [4].

2. Examination of Types of Elastomer Contained in Pressure Sensitive Adhesive Layer 2-1. Preparation of Raw Materials First, raw materials used for production of the protective films of each of Examples are as follows.
<Polyolefin>
Homopolypropylene having melting point of 162° C. (MFR (heating temperature: 230° C.)=0.5 g/10 min)
Linear low-density polyethylene having melting point of 121° C. (MFR (heating temperature: 190° C.)=2.5 g/10 min)
Linear low-density polyethylene having melting point of 114° C. (MFR (heating temperature: 190° C.)=2.0 g/10 min)
<Elastomer>
Styrene-ethylene-butylene-styrene block copolymer (SEBS)
Styrene-isobutylene-styrene block copolymer (SIBS)
α-olefin/polypropylene copolymer elastomer 2-2. Production of Protective Film Example 1B

[1B] First, as a formation of a pressure sensitive adhesive layer, SEBS and a linear low-density polyethylene having a melting point of 114° C. were kneaded such that the content of SEBS was set to 10 wt %, thereby preparing a pressure sensitive adhesive layer forming material (resin composition).

[2B] Next, the prepared pressure sensitive adhesive layer forming material, a linear low-density polyethylene having a melting point of 121° C. as a second layer (intermediate layer) forming material, and a homopolypropylene having a melting point of 162° C. as a first layer (outermost layer) forming material were respectively stored in three extruders.

[3B] Next, these forming materials were extruded from the three extruders after being melted. Thereafter, from a co-extrusion T die, a laminate in a molten state, in which these forming materials were laminated in layers, was obtained, and this laminate was cooled to obtain a protective film of Example 1B.

Example 2B

A protective film of Example 2B was obtained in the same manner as in Example 1B described above, except that SIBS was used in place of SEBS in the step [1B].

Example 3B

A protective film of Example 3B was obtained in the same manner as in Example 1B described above, except that an α-olefin/polypropylene copolymer elastomer was used in place of SEBS in the step [1B].

2-3. Evaluation

The protective films of each of Examples were evaluated according to the following method.

<1> Evaluation of Adhesiveness Before Heat Bending

First, resin substrates (manufactured by Sumitomo Bakelite Co., Ltd., "P1352") formed by holding a polarizer with two polycarbonate substrates (polycarbonate layers) were respectively prepared for the protective films of each of Examples. Both surfaces of the resin substrate were pressure-bonded under a condition of a load of 0.5 kg/cm² using a roll so that the protective films were attached thereto, thereby obtaining a laminate.

Next, peel strength between the polycarbonate substrate and the protective film was measured in conformity with JISC-6481: 1996. Next, the evaluation was performed as follows based on the obtained peel strength.

A: peel strength was in a range of 0.10 N/25 mm to 1.5 N/25 mm.
B: peel strength was 0.05 N/25 mm or more and less than 0.10 N/mm, or more than 1.5 N/25 mm and 3.0 N/25 mm or less.
C: peel strength was less than 0.05 N/25 mm or more than 3.0 N/25 mm.

<2> Evaluation of Adhesive Residues after Heat Bending

First, resin substrates (manufactured by Sumitomo Bakelite Co., Ltd., "P1352") formed by holding a polarizer with two polycarbonate substrates (polycarbonate layers) were respectively prepared for the protective films of each of Examples. Both surfaces of the resin substrate were pressure-bonded under a condition of a load of 0.5 kg/cm² using a roll so that the protective films were attached thereto, thereby obtaining a laminate.

Next, after the laminate was heat-bent by vacuum molding while being heated at a heating temperature of 150° C., the protective films were peeled off from the polycarbonate substrate, and the presence or absence of adhesive residues on the polycarbonate substrate was observed. The evaluation was performed as follows based on the observation result of the presence or absence of adhesive residues.

A: adhesive residues were not found at all.
B: small amount of adhesive residues was found.
C: adhesive residues were clearly found.

The evaluation results of the protective films of each of Examples, which had been obtained in the above-described manner, are listed in Table 2.

TABLE 2

| | | | Content of styrene (wt %) | Example 1B | Example 2B | Example 3B |
|---|---|---|---|---|---|---|
| First Layer | Configuration of first layer | Homopolypropylene having melting point of 162° C. (wt %) | — | | 100 | |
| | | Average thickness (nm) | | | 50 | |
| Second Layer | Configuration of second layer | Linear low-density polyethylene having melting point of 121° C. (wt %) | — | | 100 | |
| | | Average thickness (nm) | | | 20 | |
| Pressure sensitive adhesive layer | Configuration of pressure sensitive adhesive layer | Linear low-density polyethylene having melting point of 114° C. (wt %) | — | 90 | 90 | 90 |
| | | Styrene-ethylene-butylene-styrene block copolymer (SEBS) (wt %) | 12 | 10 | | |
| | | Styrene-isobutylene-styrene block copolymere (SIBS) (wt %) | 20 | | 10 | |
| | | α-olefin/polypropylene copolymere elastomer Average thickness (nm) | — | | | 10 |
| Evaluation result | | Adhesive before heat bending | | A | B | A |
| | | Adhesive residues after heat binding | | A | B | B |

As listed in Table 2, in the protective films of each of Examples, it was indicated that, by configuring the pressure sensitive adhesive layer to contain the elastomer, the protective film could be peeled off from the polycarbonate substrate without adhesive residues on the polycarbonate substrate in the heat-bent laminate of the polycarbonate substrate and the protective film.

3. Examination of Melting Point of Polyolefin Contained in Pressure Sensitive Adhesive Layer 3-1. Preparation of Raw Materials First, raw materials used for production of the protective films of each of Examples are as follows.

<Polyolefin>
Random polypropylene having melting point of 132° C. (MFR (heating temperature: 230° C.)=1.5 g/10 min)
Linear low-density polyethylene having melting point of 121° C. (MFR (heating temperature: 190° C.)=2.5 g/10 min)
Linear low-density polyethylene having melting point of 121° C. (MFR (heating temperature: 190° C.)=0.9 g/10 min)
Linear low-density polyethylene having melting point of 114° C. (MFR (heating temperature: 190° C.)=2.0 g/10 min)
Low-density polyethylene having melting point of 110° C. (MFR (heating temperature: 190° C.)=0.8 g/10 min)
Homopolypropylene having melting point of 162° C. (MFR (heating temperature: 230° C.)=0.5 g/10 min)

<Elastomer>

Styrene-ethylene-butylene-styrene block copolymer (SEBS) having styrene content of 12 wt %

3-2. Production of Protective Film

Example 1C

[1C] First, as a formation of a pressure sensitive adhesive layer, SEBS having a styrene content of 12 wt % and a linear low-density polyethylene having a melting point of 114° C. were kneaded such that the content of SEBS was set to 10 wt %, thereby preparing a pressure sensitive adhesive layer forming material (resin composition).

[2C] Next, the prepared pressure sensitive adhesive layer forming material, a linear low-density polyethylene having a melting point of 121° C. as a second layer (intermediate layer) forming material, and a homopolypropylene having a melting point of 162° C. as a first layer (outermost layer) forming material were respectively stored in three extruders.

[3C] Next, these forming materials were extruded from the three extruders after being melted. Thereafter, from a co-extrusion T die, a laminate in a molten state, in which these forming materials were laminated in layers, was obtained, and this laminate was cooled to obtain a protective film of Example 1C.

Examples 2C to 5C

Protective films of Examples 2C to 5C were obtained in the same manner as in Example 1C described above, except that the types of polyolefin contained in the pressure sensitive adhesive layer forming material prepared in the step [1C] were respectively changed as shown in Table 3.

3-3. Evaluation

The protective films of each of Examples were evaluated according to the following method.

<1> Evaluation of Adhesive Force Before Protective Film had Undergone Heat History First, resin substrates (manufactured by Sumitomo Bakelite Co., Ltd., "P1352") formed by holding a polarizer with two polycarbonate substrates (polycarbonate layers) were respectively prepared for the protective films of each of Examples. Both surfaces of the resin substrate were pressure-bonded under a condition of a load of 0.5 kg/cm² using a roll so that the protective films were attached thereto, thereby obtaining a laminate.

Next, after storing the laminate under a temperature condition of 50° C. for 12 hr, a peel strength $T_1$ between the polycarbonate substrate and the protective film was measured in conformity with JIS C-6481: 1996.

<2> Evaluation of Adhesive Force after Protective Film had Undergone Heat History First, resin substrates (manufactured by Sumitomo Bakelite Co., Ltd., "P1352") formed by holding a polarizer with two polycarbonate substrates (polycarbonate layers) were respectively prepared for the protective films of each of Examples. Both surfaces of the resin substrate were pressure-bonded under a condition of a load of 0.5 kg/cm² using a roll so that the protective films were attached thereto, thereby obtaining a laminate.

Next, after storing the laminate under a temperature condition of 150° C. for 5 min, a peel strength $T_2$ between the polycarbonate substrate and the protective film was measured in conformity with JIS C-6481: 1996.

<3> Evaluation of Size of Gripping Part

First, resin substrates (manufactured by Sumitomo Bakelite Co., Ltd., "P1352") formed by holding a polarizer with two polycarbonate substrates (polycarbonate layers) were respectively prepared for the protective films of each of Examples. Both surfaces of the resin substrate were pressure-bonded under a condition of a load of 0.5 kg/cm² using a roll so that the protective films were attached thereto, thereby obtaining a laminate. Thereafter, the laminate was punched in the thickness direction to form a laminate (diameter: 7.5 cm) having a circular shape in a plan view.

Next, the laminate which had been formed into a circular shape was heat-bent by performing press molding while being heated at 150° C. In this manner, the circular laminate was formed into a curved shape in which the radius R of curvature was 8.5 cm.

Next, a length $L_1$ of a gripping part in the laminate which had been heat-bent and a diameter $L_2$ of the laminate in a plan view were measured, and $(L_1/L_2) \times 100$ was obtained, and then the evaluation was performed as follows based on the obtained result of $(L_1/L_2) \times 100$.

A: obtained result was in a range of 0.2% to 0.5%.

B: obtained result was 0.1% or more and less than 0.2%, or more than 0.5% and 1.0% or less.

C: obtained result was less than 0.1% or more than 1.0%.

<4> Evaluation of Presence or Absence of Bonding Between Gripping Parts

First, resin substrates (manufactured by Sumitomo Bakelite Co., Ltd., "P1352") formed by holding a polarizer with two polycarbonate substrates (polycarbonate layers) were respectively prepared for the protective films of each of Examples. Both surfaces of the resin substrate were pressure-bonded under a condition of a load of 0.5 kg/cm² using a roll so that the protective films were attached thereto, thereby obtaining a laminate. Thereafter, the laminate was punched in the thickness direction to form a laminate (diameter: 7.5 cm) having a circular shape in a plan view.

Next, the laminate which had been formed into a circular shape was heat-bent by performing press molding while being heated at 150° C. In this manner, the circular laminate was formed into a curved shape in which the radius R of curvature was 8.5 cm.

Next, in the laminate which had been heat-bent, the presence or absence of bonding between two gripping parts was observed, and then the evaluation was performed as follows based on the observation result.

A: no bonding was clearly observed between the two gripping parts, and the two gripping parts could be easily used as a gripping part at the time of peeling off the protective film.

B: although some bonding was observed between the two gripping parts, the two gripping parts could be relatively easily used as a gripping part at the time of peeling off the protective film.

C: bonding was clearly observed between the two gripping parts, and the two gripping parts could not be used as a gripping part at the time of peeling off the protective film.

The evaluation results of the protective films of each of Examples, which had been obtained in the above-described manner, are listed in Table 3.

TABLE 3

| | | | MFR | Example 1C | Example 2C | Example 3C | Example 4C | Example 5C |
|---|---|---|---|---|---|---|---|---|
| First layer | Configuration of first layer | Homopolypropylene having melting point of 162° C. (wt %) | 0.5 | | | 100 | | |
| | | Average thickness (nm) | | | | 50 | | |
| Second layer | Configuration of second layer | Linear low-density polyethylen having melting point of 121° C. (wt %) | 2.5 | | | 100 | | |
| | | Average thickness (nm) | | | | 20 | | |
| Pressure sensitive adhesive layer | Configuration of pressure sensitive adhesive layer | Random polypropylene having melting point of 163° C. (wt %) | 1.5 | | 50 | | | |
| | | Linear low-density polyethylene having melting point of 121° C. (wt %) | 2.5 | | | 90 | | |
| | | Linear low-density polyethylene having melting point of 121° C. (wt %) | 0.9 | | | | 90 | |
| | | Linear low-density polyethylene having melting point of 114° C. (wt %) | 2.0 | 90 | | | | |
| | | Low-density polyethylene having melting point of 110° C. (wt %) | 0.8 | | | | | 90 |
| | | Styrene-ethylene-butylene-styrene block copolymer (SEBS) (wt %) | | 10 | 50 | 10 | 10 | 10 |
| | | Average thickness (nm) | | | | 10 | | |
| Evaluation result | | Peel strength $T_1$ (after being stored under a temperature condition of 50° C. for 12 hr) (N/25 mm) | | 0.20 | 0.10 | 0.15 | 0.15 | 0.15 |
| | | Peel strength $T_2$ (after being stored under a temperature condition of 150° C. for 5 min) (N/25 mm) | | 0.40 | 1.60 | 0.30 | 0.30 | 1.00 |
| | | Gripping part (($L_1/L_2$) × 100) (%) | | A | A | A | B | B |
| | | Presence or absence of bonding between gripping parts | | A | A | A | A | A |

As listed in Table 3, in the protective films of each of Examples, since the pressure sensitive adhesive layer contains a thermoplastic resin having a melting point of lower than 150° C., both the peel strength $T_1$ and the peel strength $T_2$ were set to be within a range of 0.05 N/25 mm to 3.0 N/25 mm. Therefore, it was found that the punching and heat bending of the resin substrate in the step [2] and the step [3] could be performed without peeling the protective film off from the resin substrate, and the protective film was attached to the resin substrate to the extent that the peeling of the protective film off from the resin substrate in the step [4] could be performed even in a case where the protective film had undergone heat history due to the heat bending in the step [3].

INDUSTRIAL APPLICABILITY

According to the present invention, it is possible to respectively form, on both surfaces of a resin substrate, a gripping part in which a part of a protective film protrudes from an edge of the resin substrate in a surface direction of the resin substrate, in a case of, after heat bending, peeling off the protective films respectively attached to the both surfaces of the resin substrate. In addition, it is possible to accurately suppress or prevent the gripping parts which respectively protrude from the both surfaces of the resin substrate from being bonded to each other. Therefore, the protective film can be smoothly peeled off using the gripping part as a starting point without taking time and labor. Accordingly, in a case where the resin substrate is applied to, for example, a resin substrate of a lens for sunglasses, a lens for sunglasses can be produced with high productivity. Therefore, the present invention has industrial applicability.

The invention claimed is:

1. A protective film for performing heat bending on a resin substrate, comprising:
    a base material layer; and
    a pressure sensitive adhesive layer configured to adhere to the resin substrate such that the pressure sensitive adhesive layer is positioned between the base material layer and the resin substrate,
    wherein the base material layer comprises a laminate including a first layer and a second layer such that the first layer is positioned on an opposite side of the pressure sensitive adhesive layer, includes a thermoplastic resin and has a melting point of 150° C. or higher, and that the second layer is positioned on a pressure sensitive adhesive layer side, includes a thermoplastic resin and has a melting point of lower than 130° C., the pressure sensitive adhesive layer includes a polyolefin having a melting point of lower than 150° C. and an elastomer such that a content of the elastomer in the pressure sensitive adhesive layer is in a range of 3 wt % to 50 wt %, the thermoplastic resin in the second layer is a linear low-density polyethylene, and a melt flow rate of the thermoplastic resin in the second layer measured under a condition of a heating temperature of 190° C. and a load of 2.16 kgf in conformity with JIS K7210 is in a range of 0.9 g/10 min to 3.0 g/10 min.

2. The protective film according to claim 1, wherein the thermoplastic resin in the first layer is a polyolefin.

3. The protective film according to claim 1, wherein the content of the elastomer in the pressure sensitive adhesive layer is a range of 5 wt % to 30 wt %.

4. The protective film according to claim 1, wherein the elastomer in the pressure sensitive adhesive layer includes a styrene-olefin-styrene block copolymer.

5. The protective film according to claim 1, wherein an average thickness of the first layer is in a range of 10 μm to 80 μm.

6. The protective film according to claim 1, wherein an average thickness of the second layer is in a range of 10 μm to 60 μm.

7. The protective film according to claim 1, wherein the protective film is provided in a pair such that the pair of protective films are configured to be attached to both surfaces of a resin substrate, respectively.

8. The protective film according to claim 1, wherein a coating layer comprising a single layer or a laminate having at least one of a polycarbonate resin layer, a polyamide resin layer, and a cellulose resin layer is positioned on at least one surface of a resin substrate to which the pressure sensitive adhesive layer is configured to adhere.

9. The protective film according to claim 1, wherein the heat bending includes subjecting the resin substrate to the heat bending by press molding or vacuum molding.

10. The protective film according to claim 2, wherein the content of the elastomer in the pressure sensitive adhesive layer is a range of 5 wt % to 30 wt %.

11. The protective film according to claim 10, wherein the elastomer in the pressure sensitive adhesive layer includes a styrene-olefin-styrene block copolymer.

12. The protective film according to claim 2, wherein an average thickness of the first layer is in a range of 10 μm to 80 μm.

13. The protective film according to claim 2, wherein an average thickness of the second layer is in a range of 10 μm to 60 μm.

14. The protective film according to claim 2, wherein the protective film is provided in a pair such that the pair of protective films are configured to be attached to both surfaces of a resin substrate, respectively.

15. The protective film according to claim 2, wherein a coating layer comprising a single layer or a laminate having at least one of a polycarbonate resin layer, a polyamide resin layer, and a cellulose resin layer is positioned on at least one surface of a resin substrate to which the pressure sensitive adhesive layer is configured to adhere.

16. The protective film according to claim 2, wherein the heat bending includes subjecting the resin substrate to the heat bending by press molding or vacuum molding.

17. The protective film according to claim 4, wherein an average thickness of the first layer is in a range of 10 μm to 80 μm.

18. The protective film according to claim 4, wherein an average thickness of the second layer is in a range of 10 μm to 60 μm.

19. The protective film according to claim 4, wherein the protective film is provided in a pair such that the pair of protective films are configured to be attached to both surfaces of a resin substrate, respectively.

20. The protective film according to claim 4, wherein a coating layer comprising a single layer or a laminate having at least one of a polycarbonate resin layer, a polyamide resin layer, and a cellulose resin layer is positioned on at least one surface of a resin substrate to which the pressure sensitive adhesive layer is configured to adhere.

* * * * *